(12) United States Patent (10) Patent No.: US 12,622,447 B2

Ötvös (45) Date of Patent: May 12, 2026

(54) RING-SHAPED SAUSAGE AND METHOD FOR MANUFACTURING SAME

(71) Applicant: Attila Ötvös, Fukuoka (JP)

(72) Inventor: Attila Ötvös, Fukuoka (JP)

( * ) Notice: Subject to any disclaimer, the term of this patent is extended or adjusted under 35 U.S.C. 154(b) by 0 days.

(21) Appl. No.: 19/102,974

(22) PCT Filed: Aug. 28, 2023

(86) PCT No.: PCT/JP2023/033630
§ 371 (c)(1),
(2) Date: Feb. 11, 2025

(87) PCT Pub. No.: WO2024/058257

PCT Pub. Date: Mar. 21, 2024

(65) Prior Publication Data

US 2025/0261669 A1 Aug. 21, 2025

(30) Foreign Application Priority Data

Sep. 13, 2022 (JP) ................................. 2022-144953

(51) Int. Cl.
A23L 13/60 (2016.01)
A22C 11/00 (2006.01)

(52) U.S. Cl.
CPC .............. A23L 13/65 (2016.08); A22C 11/00 (2013.01)

(58) Field of Classification Search
CPC ........ A23L 13/65; A22C 11/00; A22C 11/005
See application file for complete search history.

(56) References Cited

FOREIGN PATENT DOCUMENTS

| DE | 29821527 U1 | * | 4/1999 | ............. A23L 13/65 |
|----|-------------|---|--------|-------------------------|
| EP | 0956772 A1 | * | 11/1999 | ............. A22C 11/00 |
| HU | 194708 B | * | 3/1988 | |
| JP | 64-080262 A | | 3/1989 | |
| JP | 1-098461 A | | 4/1989 | |
| JP | 2-023493 U1 | | 2/1990 | |
| JP | 2-145171 A | | 6/1990 | |
| JP | 2000-300164 A | | 10/2000 | |
| JP | 2-023493 B1 | | 2/2023 | |

OTHER PUBLICATIONS

International Search Report for International Application PCT/JP2023/033630 dated Nov. 14, 2023.
Written Opinion for International Application PCT/JP2023/033630 dated mailed Nov. 14, 2023.

(Continued)

*Primary Examiner* — Vera Stulii

(74) *Attorney, Agent, or Firm* — Ladas & Parry LLP

(57) ABSTRACT

The subject of the invention is a sausage shaped into a regular ring form, which avoids losing its shape due to the opening or displacement of the connected parts during cooking, frying, and serving. The ring-shaped sausage ("S") is a product in which the tubular casing ("1") is filled with a raw component ("2") containing minced or finely-chopped meat, seasoned with salt or other spices, shaped to a specified length, then one end section ("101") is pulled into the seasoned component ("2") in the other end section ("102"), connecting the two ends, resulting in a ring with a specified diameter.

4 Claims, 1 Drawing Sheet

(56)  References Cited

OTHER PUBLICATIONS

Figures 1, 2, 3, 4, 5:
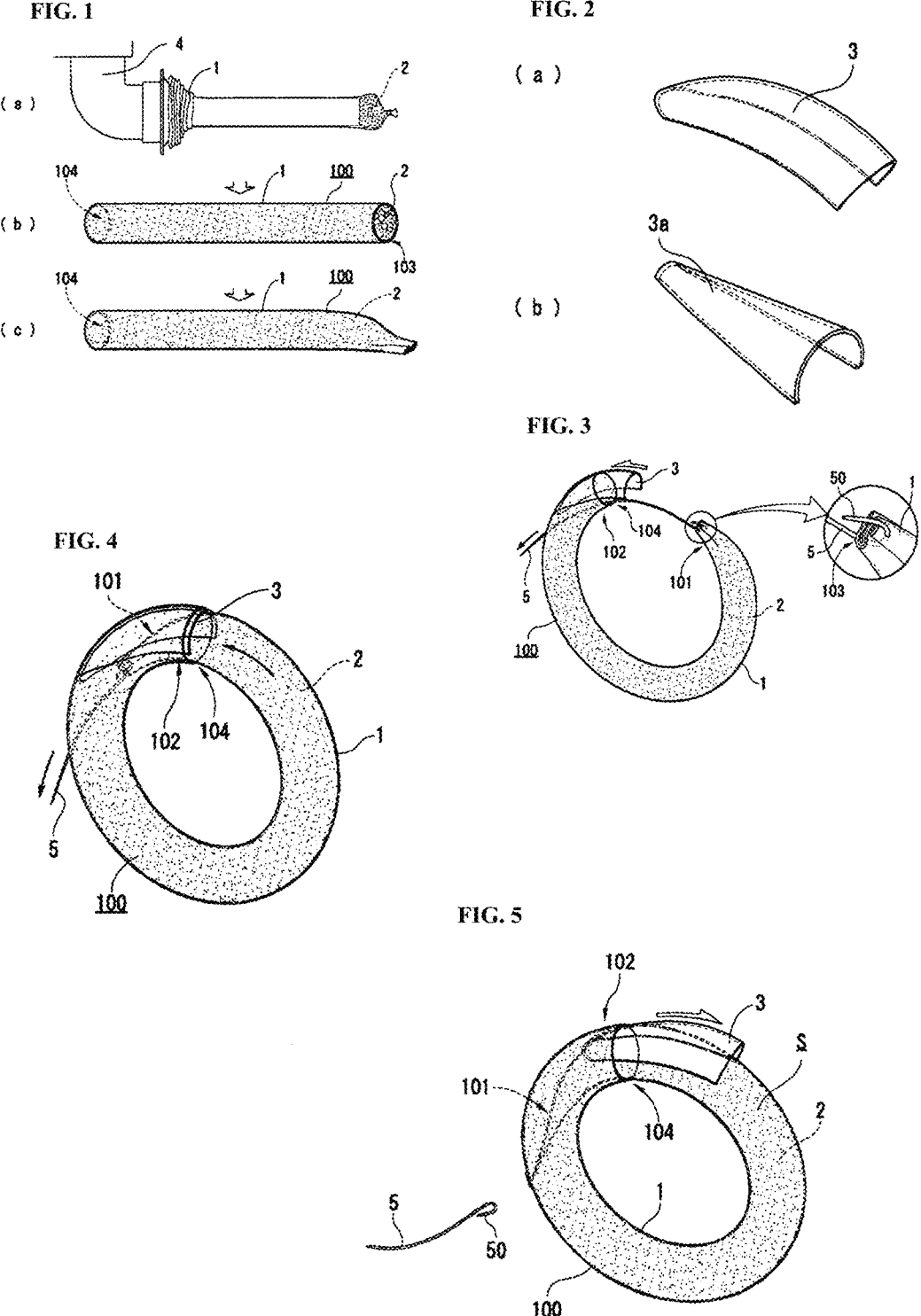

Costco Street [Online] Jun. 2, 2014 [retrieval date Oct. 19, 2022], Internet:<URL:https://costcotuu.com/20140602/post_37443.html> Fleischwurst Wiener Sausage, (Costco Tuu [online]).

Dreambeer [online], Dec. 9, 2021 [retrieval date Oct. 14, 2022], Internet:<URL:https://dreambeer.jp/blog/pairing/20211209blog/> The world of German sausage you need to know.

Recipe blog [online] Mar. 11, 2011 [retrieval date Oct. 17, 2022], Internet:<URL:https://www.recipe-blog.jp/profile/3832/recipe/216305> Swim ring rabbit lunch box, non-official translation (Recipe blog [online]).

Cookpad [Online], Oct. 8, 2009 [retrieval date Oct. 17, 2022], Internet:<URL:https://cookpad.com/recipe/931168> Donut© Wiener Character bento, (Cookpad [online]).

* cited by examiner ( a )

( b )

( c )

( a )

( b )

RING-SHAPED SAUSAGE AND METHOD FOR MANUFACTURING SAME

CROSS-REFERENCE TO RELATED APPLICATIONS

This application is an application under 35 U.S.C. 371 of International Application No. PCT/JP2023/033630 filed on 28 Aug. 2023 which claims priority from Japanese Application 2022-144953 filed on 13 Sep. 2022 which applications are incorporated herein by reference in their entirety.

SUBJECT OF THE INVENTION

Ring-shaped sausage and its method of production

TECHNICAL FIELD

The present invention relates to a ring-shaped sausage and its method of production. Specifically, it refers to a sausage that is shaped into a stable ring, as well as the method of production, which prevents the sausage from losing its shape during cooking or serving due to the splitting or shifting of the joined sections.

STATE OF THE ART

Sausage stuffed into casing is made by stuffing ground or finely-chopped meat, seasoned with salt and other spices, into sheep intestines or other tube-shaped casings, to make a dish enjoyed in many parts of the world. These kinds of sausages, stuffed into casing, traditionally have a mostly straight or slightly curved rod-like shape. Therefore, they cannot be presented in a visually appealing manner after preparation.

Thus, a ring-shaped sausage has been proposed, which is a uniquely designed sausage, allowing various foods to be placed or filled into the empty space in the centre of the ring, and can also be well used as an appetiser (see: Patent Literature No. 1).

In the case of the sausage described in Patent Literature No. 1, raw sausage—made from base materials such as animal meat, fish meat, or similar ingredients—is produced using a known method and then stuffed into a mould, shaping the filling into a rod shape. After drying, smoking, or cooking the filling—or without any of these processes—it is spirally wound around a rod-shaped tool. If the aforementioned processes have not been carried out then, after performing the desired process, the filling wound into the aforementioned spiral shape is divided into full ring quantities, cut in two places per ring, and the two cut surfaces are joined, thus forming the sausage into a ring shape.

PRIOR ART LITERATURE

Patent literature

Patent Literature No. 1 Official Gazette No. 64-80262 of the Japan Patent Office

OVERVIEW OF THE INVENTION

The Problem the Invention Aims to Solve

In the case of the "Sausage with a ring shape and its method of production" described in the aforementioned Patent Literature No. 1, the following problems arose: After cutting the sausage at two places per ring and joining the cut surfaces to form the shape, it was rare that the position and angle of the two cut surfaces aligned perfectly, making it difficult to create neatly-shaped rings.

It was especially difficult to form the ring shape if the diameter was too small, making it impossible to join the cut surfaces. Even if the two cut surfaces were nicely joined, since the joined parts were not fixed, they separated during cooking or serving, and the sausage returned to its original shape when the cut surfaces did not connect to each other.

The present invention was developed considering the above points and aims to enable the production of a ring-shaped sausage and provide a method of production that results in the sausage stably maintaining the ring shape formed, avoiding the loss of shape due to the opening or displacement of the connected part during cooking, frying, and serving.

Method for Solving the Problem

[1] To achieve the above-described objective, the present invention is a ring-shaped sausage, wherein a tubular casing is stuffed with minced or finely-chopped meat seasoned with salt and other spices, and shaped to a specified length. The two ends of the sausage are connected in a manner where one end section is inserted into the interior of the aforementioned seasoned component at the other end section, thus forming the sausage into a ring shape of a specified diameter.

In the case of the present invention, the main component of the sausage stuffed into the casing can be used as the base section, which is created by stuffing minced meat, finely-chopped meat, or other similar base materials seasoned with salt and spices into a tubular casing.

The tubular casing stuffed with the seasoned component is shaped to a specified length, and since one end section is inserted into the interior of the seasoned component at the other end section, thus connecting the two end sections, the shape remains stable, resulting in a regular ring-shaped sausage. The sausage is designed to retain its shape during frying, cooking, and serving, even if the joined parts might otherwise come apart or move.

Since the product is uniformly shaped into a ring of a specified diameter, its design is unique, allowing various foods to be placed or filled into the empty space in the centre of the ring, and it can also be well used as an appetiser thus, in this respect, it matches existing ring-shaped sausages.

It should also be noted that in the context of the present invention, the base material of "minced meat or finely-chopped meat" is not limited to, for example, beef, pork, and other large slaughter animal' meat, but also includes poultry, fish meat traditionally used for sausage making, as well as so-called soy meat and other plant-based artificial meats.

[2] The present invention, i.e. the ring-shaped sausage, can also be designed such that one of the aforementioned end sections tapers, and its tip is led through a specified part of the aforementioned casing to the outer part of the ring.

In this case, since the inner end section of the sausage is extended, the casing is also elongated, thus remaining crispy during consumption, and its texture does not deteriorate. Moreover, since the tip of one end section (the end section of the casing) passed through a designated section and becomes secured to the casing due to the pressure of the seasoned component inside the sausage end section, the ring shape is even more effectively prevented from falling apart. Furthermore, since the penetrating end section closes the hole, it is possible to prevent the seasoned filling inside from falling out, thus the hole itself does not cause a problem.

If the ring-shaped sausage is subjected to drying, smoking, or cooking processes according to common practice, the seasoned component in the casing slightly hardens (or solidifies) due to the heat treatment, allowing the product to retain its shape, and in addition, especially in the case of smoking, it acquires a more unique aroma and taste. During smoking or cooking, the heat treatment ensures sterilisation, allowing the product to preserve its quality for a longer time.

[3] In order to accomplish this objective, the present invention outlines a method of production for ring-shaped sausage, which includes the following steps: filling the tube-shaped casing with raw ingredients, such as ground or finely-chopped meat, seasoned with salt or other spices, thereby forming the base section of the sausage stuffed into the casing; trimming the end sections of the base section to the desired length; securing the tip of the pulling tool to the casing at the first end section of the base section described earlier; inserting the guiding tool into the seasoned component inside the base section from the other end, which serves to guide the first end section; bending the base section and inserting the base part of the previously mentioned pulling tool into the seasoned component from the other end of the base section, then pulling it through the appropriate section of the casing to the outside. Then, the external part is pulled further to draw the first end of the base section along the guiding tool into the seasoned component; pulling the first end of the previously mentioned base section enough so that it presses firmly against or sticks to the inner surface of the guiding tool, and after shaping the entire base section into a ring, disconnecting the pulling tool from the base section; and removing the previously mentioned guiding tool from the base section.

The present invention enables the shaping of a sausage base section, stuffed into a casing, which serves as the base material for producing a ring-shaped sausage. It is made by stuffing a tubular casing with raw, seasoned ingredients, like minced or finely-chopped meat, along with salt and other spices.

Furthermore, by cutting the end sections of the base sections to shape them to a specified length, each piece shaped to a predetermined length can be used as the base material for a ring-shaped sausage, and if the lengths of the pieces are made uniform, it is possible to produce ring-shaped sausages of uniform diameter (size) due to the identical manufacturing method.

Furthermore, by attaching the tip of the pulling tool to the casing at the first end of the base section, it is possible to pull this end of the base section with sufficient force using the pulling tool. This makes it possible to pull the first end of the base section into the interior of the seasoned component through the other end section.

Additionally, by inserting and securing the guiding tool into the seasoned component through the other end of the base section, this guiding tool is able to guide the first end of the base section during its pulling process.

The guiding tool positioned on the seasoned component at the second end section strengthens the tubular casing from within, thereby helping to prevent the deformation of the other end section of the base section during the pulling process, thereby facilitating the workflow.

As the base section is bent and the base part of the pulling tool is inserted into the seasoned component through the other end, it is pulled outside through a designated section of the casing. By pulling the outer part further and guiding the first end of the base section along the guiding tool into the seasoned component, sufficient length of the first end section is left to complete the pulling. At the other end of the base section, the internal pressure of the seasoned component in the casing increases as the first end section of the base section presses strongly, causing the seasoned component to tightly wrap around the first end section, which makes separating the two end sections more difficult.

By pulling one end of the base section so that it is securely pressed or adhered to the guiding tool's inner surface, and after shaping the entire base section into a ring, we disconnect the pulling tool and, after removing the guiding tool, obtain an edible, ring-shaped sausage.

By applying the method of the present invention, filling a tubular casing with a seasoned component, shaping it to a specified length, and pulling one end section into the interior of the seasoned component through the other end section, it becomes possible to produce a ring-shaped sausage with the two end sections connected. Thanks to the process, it can stably maintain its ring shape, while also avoiding the sausage losing its this shape due to the disintegration or displacement of the connected parts during cooking, frying, or serving.

[4] In order to accomplish the above objective, the present invention outlines a method of production for ring-shaped sausage, which includes the following steps: filling the tube-shaped casing with raw ingredients, such as ground or finely-chopped meat, seasoned with salt or other spices, thereby forming the base section of the sausage stuffed into the casing; trimming the end sections of the base section to the desired length; tapering one end of the previously mentioned base section and freezing a specified length from the tip to achieve a certain level of hardness; bending the previously mentioned base section, then pressing its frozen first end section into the seasoned component at the other end section of the base section to a specified depth, and pulling or inserting the tip of the first end section through a designated part of the casing without piercing through it, ultimately shaping the entire base section into a ring.

The present invention enables the shaping of a sausage base section, stuffed into a casing, which serves as the base material for producing a ring-shaped sausage. It is made by stuffing a tubular casing with raw, seasoned ingredients, like minced or finely-chopped meat, along with salt and other spices.

Furthermore, by cutting the end sections of the base sections and shaping them to a specified length, each piece shaped to a predetermined length can be used as the base material for a ring-shaped sausage. Furthermore, if the pieces are cut to a uniform length, it becomes possible to produce ring-shaped sausages of the same diameter (size) due to the identical manufacturing method.

Additionally, by tapering one end of the base section and freezing a specified length from the tip to achieve a specified hardness, this end of the sausage will be less prone to deformation even under pressure. Furthermore, this facilitates and makes more secure the insertion into the other end section of the sausage in a later step of the work process.

Furthermore, when the base section is bent and the frozen first end section is pressed to a specified depth into the seasoned component at the other end of the base section, and the tip of the first end section is either pulled outside through a designated point in the casing or left inside without breaking through the casing, the entire base section is shaped into a ring. As a result of this process, the frozen sausage end section, once inserted into the seasoned component at the other end, is unlikely to fall out or shift.

If the tip of the first end section is pulled outside through a specific section of the casing, the first sausage end section compresses within the casing under the pressure of the seasoned component, further preventing deformation. Furthermore, if the first end section is left inside without breaking through the casing, it simplifies and facilitates the operation.

By applying the process of the present invention, we can manufacture a ring-shaped sausage by filling a tube-shaped casing with a seasoned component, forming it to a specified length, and connecting the two ends by inserting one end section through the other into the seasoned component inside. As a result, it can stably maintain its regular ring shape, while also avoiding the sausage losing this shape due to the disintegration or displacement of the connected parts during cooking, frying, or serving.

[5] The method for producing a ring-shaped sausage, which is the subject of the present invention, also allows for a design where one end of the aforementioned base section is tapered, pulled through the other end of the base section, and then the tip of the first end section is pulled outside through a specified point of the aforementioned casing.

In this case, the pulling operation does not create significant resistance, and the sausage end section can be pulled in relatively easily. Moreover, since the pulled part of the first end of the base section also becomes sufficiently long, the fixing force resulting from the internal pressure of the seasoned component increases. This not only prevents the loss of the ring shape but also improves the efficiency of the production process.

Furthermore, with the elongation of the pulled part of the first sausage end section, the casing also stretches, making it crispy during consumption, and its texture does not deteriorate. Since the tip of the first sausage end section breaking through a specified part of the casing compresses into the casing due to the pressure of the seasoned component inside, the loss of the ring shape can be even more effectively prevented.

[6] The method for producing a ring-shaped sausage, which is the subject of the present invention, also allows for a design where the tip of the aforementioned pulling tool at one end section of the aforementioned base section connects to the aforementioned casing by hooking the hook section of the pulling tool into the casing.

The casings used for stuffing, particularly the widely used sheep casings, pig casings, and similar casings, are characterised by being thin yet strong, thus hooking the hook section of the pulling tool into these provides a sufficiently strong connection, which allows for the quick and secure connection of the two sausage end sections. Based on all these, the process ensures an efficient production workflow.

[7] The present invention, the method for producing a ring-shaped sausage, can also be designed so that the aforementioned guiding tool aligns closely with the curved part of the aforementioned base section, bending both longitudinally and laterally, creating a semi-circular shape of a specified length.

In this case, the guiding tool bends longitudinally so that it practically lies on top of the bent part of the base section, thus even if we direct the guiding tool to the inner surface of the casing, it would still be difficult to damage the casing, so we can safely place it even if it presses tightly against the inner surface of the casing. With this method, the part of the base section where we lead the opposite sausage end section into the seasoned component can be larger. If the end section to be inserted becomes slightly thicker, it can still be pulled in successfully.

Furthermore, since the guiding tool has a straight, longitudinal shape, there is only minimal resistance when it is inserted into or pulled out of the seasoned component, making the operation easy to perform. Notably, this minimises the risk of the seasoned component catching or being pulled out when the guiding tool is removed, thereby decreasing the need for repair operations.

[8] The present invention, the production of a ring-shaped sausage, can also be carried out by forming or removing the seasoned component in the aforementioned casing on the inner side of the aforementioned guiding tool inserted into the seasoned component from the other end of the aforementioned base section, and forming an entrance for pulling in one end of the aforementioned base section.

Since, in this case, the opening at the other end of the base section is already prepared, when the first end of the base section is pulled into the seasoned component, the starting position is predetermined, making the pulling operation easier. Furthermore, it is possible to prevent the seasoned component from overflowing and partially going to waste during the insertion of the first end section.

IMPACT OF THE INVENTION

The present invention enables the production of a ring-shaped sausage and provides a method of production that results in the sausage stably maintaining the ring shape formed, avoiding the loss of shape due to the opening or displacement of the connected part during cooking, frying, and serving.

SIMPLE EXPLANATION OF THE DRAWINGS

FIG. 1: shows the method of production for a ring-shaped sausage, which is the subject of the present invention, (a) an illustration explaining the process of filling the casing with the seasoned component, (b) an illustration explaining the process of filling the casing with the seasoned component, then cutting both end sections and shaping it to a specified length, (c) an illustration explaining the process of tapering the first sausage end section.

FIG. 2: shows the structure of the guiding tool used in the method for producing a ring-shaped sausage, which is the subject of the present invention, (a) an illustration of the first example, (b) an illustration of the second example.

FIG. 3: illustrates the subject of the present invention, the method for producing a ring-shaped sausage, showing the insertion of the guiding tool and the pulling needle into the casing stuffed with the seasoned component.

FIG. 4: illustrates the subject of the present invention, the method for producing a ring-shaped sausage, explaining the introduction of the tapered end of the casing stuffed with the seasoned component into the interior of the filling through the other end section.

FIG. 5: illustrates the subject of the present invention, the method for producing a ring-shaped sausage. The figure explains the process of forming the sausage into a ring shape by pulling out the guiding tool, showing the state after the tapered end of the casing, stuffed with the seasoned component, has been pulled in and connected.

MODE OF IMPLEMENTATION OF THE INVENTION

Based on FIG. 1 and FIG. 5, the mode of implementation of the present invention is hereby explained in more detail.

The ring-shaped sausage ("S") which is the subject of the present invention, compared to the state shown in FIG. 5, is a ring-shaped sausage of a specified diameter after the removal of guiding tool 3.

In the case of the ring-shaped sausage ("S"), the sheep casing filling tube ("1") is stuffed with a raw, seasoned component ("2") containing ground or finely-chopped meat, flavoured with salt or other spices. This is shaped into a base section ("100") of a specific length, from which a single ring-shaped sausage of a predetermined length and, therefore, a specified diameter can be produced. One end ("101") of the base section ("100") is joined to the other end ("102") by pulling it into the seasoned component ("2") (see FIG. 1, 3, or 5).

The base material of the casing ("1") used for filling is not limited to sheep casing but can also include pig casing, beef casing, other similar natural, edible casings, or collagen casings based on animal protein.

The method of production of the present invention, the ring-shaped sausage ("S"), is as follows.

Production Method No. 1

Below, we describe the method of production of the ring-shaped sausage ("S").

(1) Using a sausage-stuffing device ("4"), we stuff the sheep casing ("1") with the seasoned component ("2") consisting of minced or finely-chopped meat seasoned with salt and other spices, creating a so-called sausage stuffed into casing (without reference mark) of appropriate length (see: FIG. 1(a)).

(2) This sausage, stuffed into a casing, is cut to a length required to form a ring of a specific diameter (for example, 80-100 mm), and the necessary quantity of such base sections ("100") is prepared (see FIG. 1 (b)).

(3) At both ends of the base section ("100"), the casing ("1") is in an open (free) state (see FIG. 1(b)). Through the opening ("103") of one end section ("101"), an arbitrary amount of the seasoned component ("2") is removed, and the seasoned component ("2") inside the casing ("1") is shaped to taper slightly at the tip. Afterward, the end of the casing ("1") is pressed and sealed (see FIG. 1(c)).

(4) A pulling needle ("5") is prepared (as shown in FIG. 3), consisting of a metal wire of a specific length, with a hooked section, or hook ("50"), at one end, along with a curved guiding tool ("3"), made from stainless steel, which fits into the open section ("104") of the other end of the casing ("1"). The guiding tool ("3") is bent longitudinally to a specified curvature and is also bent laterally (see FIG. 2 (a)).

(5) At the first end of the base section ("100"), the hook section ("50") of the pulling needle ("5") is inserted and hooked into the sealed part of the casing ("1"). Despite being thin, the sheep casing ("1") is sufficiently strong, so it is enough to hook the hook section ("50") of the pulling tool ("5") into it: this provides a sufficiently strong connection for the quick and secure execution of the operation, contributing to work efficiency.

(6) Having hooked the hook section ("50") into one end of the base section ("100"), the guiding tool is inserted ("3") through the free opening ("104") at the opposite end ("102") into the seasoned component ("2"). At this point, the guiding tool ("3") is aligned with the interior of the casing ("1"), but it does not necessarily need to be in contact with it; it can remain at a distance (see FIG. 3).

The guiding tool ("3") bends longitudinally, practically lying on top the inner surface of the casing ("1") of the curved base section ("100"). The guiding tool ("3") can be directed towards the inner surface of the casing ("1") because it is unlikely to damage the casing ("1"). Therefore, it can even be pressed against the inside of the casing ("1"). Thanks to this, the part of the seasoned component ("2") that accommodates one end ("101") of the base section ("100") can be larger, and even if the end section ("101") to be inserted is a bit thicker, it can still be pulled in.

As for the guiding tool, the ideal design is one that is bent longitudinally, like the current guiding tool ("3"), which follows the curve of the ring-shaped sausage and can closely conform to the inside of the casing ("1"). However, for easier manufacturing, a straight guiding tool can also be used, running longitudinally (see FIG. 2(b)).

The guiding tool ("3a") is made by bending a roughly fan-shaped stainless steel sheet. The shape has different sizes at each end along its length. In other words, as shown in FIG. 2(b), the side closer to us is larger, while the side farther away is smaller. The closer edge of the part is shaped like a circle with 40% of the lower section removed, while the farther edge has 70% of the lower portion missing. This size ratio can be modified as needed.

Since its use and operation are almost the same as those of the previously described guiding tool ("3"), their explanation is omitted.

(7) By pressing the seasoned component ("2") on the inner side of the guiding tool ("3") inserted into the other (receiving) end ("102") of the base section ("100") from outside to inside, we create an entrance of a specified size (no figure reference). It is not always necessary to create the entrance; the end section of the seasoned component ("2") can remain as it is after being cut.

This is especially true for this production method, as we will mention later, since we pull in the first sausage end section ("101") using the pulling needle ("5") led from inside the casing ("1") to the outside, so even if no entrance is made into the seasoned component ("2"), the pulling position can still be easily controlled by where we lead the pulling needle through the casing. Furthermore, since the first end section ("101") is not pressed in this case, it is less likely to lose its shape.

(8) The tip of the pulling needle ("5"), located on the side opposite the hook section ("50"), is inserted into the inside of the guiding tool ("3") and pierced into the seasoned component ("2"). Then, aligning it with a specific or desired point inside the casing ("1"), the needle is pierced from the inside to the outside and pulled through. If the pulling needle ("5") is pulled outward from the part where it emerges from the inside, the thinned end ("101") of the base section ("100") fits into the prepared entrance of the seasoned component ("2") and continues to be pulled inward (see FIG. 4).

The sausage end section ("101") entering the entrance naturally finds its position due to the guidance, and since its shape tapers towards the tip, it is relatively easy to pull in and remains stable. Furthermore, the guiding tool ("3") placed on the seasoned component ("2") at the other end section ("102") strengthens the tubular casing ("1") from the inside, helping to prevent the other (receiving) end section ("102") of the base section ("100") from deforming when we hold it during the pulling operation, thus facilitating the handling of the piece during the connection process.

The positioned guiding tool ("3") also serves as a stopper for the pulling needle ("5") when the pulling needle ("5") is inserted from the other end ("102") of the base section ("100"). This prevents the error of piercing the casing ("1") with the pulling needle ("5") at the location occupied by the guiding tool ("3"), specifically near the edge of the other sausage end section ("102"). Piercing the casing in such an area, where there is a limited amount of material pulled in, would pose the risk of insufficient connection. Thus, we facilitate the piercing to occur at a specified distance from the connected part.

(9) Afterwards, one end ("101") of the base section ("100") is pulled into the seasoned component ("2") inside the guiding tool ("3"), applying sufficient pressure. As the hook section ("50") is pulled out of the casing ("1") and the hooked end ("101") (tip) of the casing emerges from the hole in the casing ("1") (no figure reference), the hook ("50") is removed.

The first end ("101") of the casing ("1"), from which the hook ("50") was detached, is wrapped with the seasoned component ("2") under pressure inside the casing ("1"), almost wedged in, making it harder to come out (see FIG. 5). Thus, deformation can be even more effectively prevented.

Furthermore, by extending the pulled-in part at one end, the casing ("1") also stretches, making the ring-shaped sausage ("S") crispy during consumption, and its texture deteriorates less. Moreover, since the tip of the piercing sausage end section closes the hole, it prevents the seasoned component ("2") inside from, for example, falling out, so the presence of the hole does not cause a problem.

(10) When the guiding tool ("3") is pulled out of the base section ("100") and the protruding parts or similar irregularities of the seasoned component ("2") at the junction of one end ("101") and the other end ("102") are adjusted, the raw, ring-shaped sausage ("S") containing the seasoned component in the casing ("1") is complete. To ensure a stronger connection, the joined sections (boundary area) can be wrapped with strips made from the same base material as the casing ("1"), optionally fixed with starch.

(11) Finally, to increase shelf life, the product is subjected to drying, smoking, or cooking (boiling) processes. It is not necessary to perform each process in every case; the product can be considered ready in its raw state or frozen raw.

In this way, by following the Production Method No. 1 of the ring-shaped sausage, which is the subject of the present invention, the sausage reliably retains its regular ring shape. Furthermore, during cooking, frying, or serving, the risk of the sausage losing its shape due to the separation or displacement of the connected section is avoided.

Impact of the Ring-Shaped Sausage ("S")

If the ring-shaped sausage ("S") undergoes a drying, smoking, or cooking process, one end ("101") of the base section ("100") is connected to the other end ("102") by being pulled into the inside of the seasoned component ("2"). This ensures that the connection point is solid, allowing the ring-shaped sausage ("S") to take on a stable form.

The ring-shaped sausage ("S") is able to maintain its shape because the seasoned component ("2") inside the casing ("1") slightly hardens as a result of the aforementioned processes. It is the smoking process in particular that imparts a unique aroma and flavour to the product. Moreover, during smoking and cooking, the heat treatment ensures sterilisation, allowing the product to preserve its quality for a longer time.

During the cooking, frying, or serving of the ring-shaped sausage ("S"), the risk of the sausage losing its ring shape due to the separation or shifting of the connected parts is also avoided. The ring-shaped sausage ("S") is a uniformly-shaped product with a specific diameter, designed with a unique ring form. Its design allows for the placement or filling of various foods in the empty space in the centre of the ring, making it ideal for use as an appetiser. In this respect, it matches existing ring-shaped sausages.

In particular in the case of natural material casings similar to those used in the present implementation, such as sheep casing, the casing ("1") becomes almost transparent in its stretched state (stuffed with the seasoned component ("2")), so the overlaps (boundary areas) at the connected parts of the casing are not noticeable. This gives the product an additional advantage, namely its visually appealing appearance and outstanding design.

Although not illustrated with a figure, the ring shape of the ring-shaped sausage can also be formed by tapering one end ("101") of the base section ("100") and freezing a specified length from the tip to give it a specified degree of hardness. Then, by pressing the frozen first end section ("101") into the interior of the seasoned component ("2") in the other end section ("102") of the base section ("100") to a specified depth, the two ends are connected.

For this method of production, the process is carried out as follows. For simplicity's sake, in the explanation, the same reference marks are used for parts of the ring-shaped sausage produced with the aforementioned Production Method No. 1 that correspond to the parts mentioned earlier.

Production Method No. 2

(1) The sausage stuffed into the casing is prepared in the same manner as in method no. 1, and it is cut to a length suitable for forming a ring with a specified diameter. Then, the required number of these base sections ("100") is produced.

(2) The casing ("1") is open at both ends of the base section ("100"). Through the opening ("103") of one end section ("101"), an arbitrary amount of the seasoned component ("2") is removed, and the seasoned component ("2") inside the casing ("1") is shaped to taper slightly at the tip. Afterward, the end of the casing ("1") is pressed and sealed.

(3) At one end ("101") of the base section ("100"), a section of a certain length (for example, a few centimetres from the tip) is frozen to harden it. The freezing range is adjusted so that it does not hinder the shaping of the base section ("100") into a ring during the subsequent process, and the frozen section can still be easily pushed in.

(4) The seasoned component ("2") at the other end ("102") of the base section ("100") is pressed from the outside, creating an opening of a specified size in the seasoned component ("2"). It is not always necessary to create the entrance; the end section of the seasoned component ("2") can remain as it is after being cut. Furthermore, it is advisable to slightly freeze the other end ("102") of the base section ("100") at this time to increase the hardness around the entrance, facilitating handling, as this simplifies the joining operation in the later stage of the process.

(5) The frozen end ("101") of the base section ("100") is inserted into the other end ("102"), aligning it with the prepared entrance. At this point, only the area around the entrance of the other end section ("102") is hard, while the seasoned component ("2") inside is relatively soft, so the end section ("101") entering the entrance naturally finds its position due to the guidance, and since its shape tapers towards the tip, it is relatively easy to pull in and remains stable.

Furthermore, with this method of production, the joining can be performed without piercing one end section ("101") of the sausage from inside the casing ("1") to the outside, and the process of forming into a ring can be easily performed without using a pulling tool.

(6) The inserted first end section ("101") can be secured by stuffing it into the open part ("104") of the other end section ("102") through the casing opening ("1"). Alternatively, it can be secured as in Production Method No. 1, by extending the tip to make it longer and pointed, and piercing the casing ("1") with it. If one end section ("101") is secured in this fashion, it is less likely to fall out, and the deformation of the ring shape can be even more effectively prevented.

(7) By smoothing out the protruding or uneven parts of the seasoned component ("2") at the connection between one end section ("101") and the other end section ("102"), the raw, ring-shaped stuffed sausage with the seasoned component ("2") inside the casing ("1") is finished.

(8) Finally, to increase shelf life, the product is subjected to drying, smoking, or cooking (boiling) processes. It is not necessary to perform each process in every case; the product can be considered ready in its raw state or frozen raw.

In this manner, by proceeding according to the method aimed at producing the ring-shaped sausage, which is the subject of the present invention, one end section ("101") of the base section ("100") is joined in a state pressed into the seasoned component ("2") at the other end section ("102"). As a result, the connection is strong, and the sausage securely retains its ring shape. This ensures that during cooking, frying, or serving, the sausage does not lose its shape due to the separation or shifting of the connected part.

The technical terms and expressions used in this descriptive section and in the description of the claims are for illustrative purposes only and are not exclusive. It is not our intention to exclude technical terms or expressions equivalent to the features described in this descriptive section and in the description of the claims, or parts thereof. Furthermore, it is self-evident that various modifications are possible within the technical concept of the present invention.

Explanation of Reference Marks

S: ring-shaped sausage
100: base section
1: casing
101: first (or one) end section of the piece
102: other end section of the piece
103: open part of the first end section
104: open part of the other end section
2: seasoned component
3: guiding tool
3*a*: guiding tool
4: sausage-stuffing device
5: pulling needle
50: hook section

The invention claimed is:

1. A process for preparing a ring shaped sausage where a tubular casing is stuffed with a composition of minced or finely-chopped meat comprising the steps of:
   inserting the composition into the tubular casing;
   cutting the tubular casing into at least one base section of a specific length having two ends;
   securing a tip of a pulling tool to the casing at one of the ends of the base section;
   inserting a guiding tool into the composition at the other end of the base section;
   bending the base section;
   inserting the pulling tool into the composition and pulling it through the casing to the outside of the casing;
   pulling the pulling tool further to draw the end of the base section into the composition until the end presses firmly against or sticks to an inner surface of the guiding tool; and
   forming the base section into a ring shape.

2. A process for preparing a ring shaped sausage where a tubular casing is stuffed with a composition of minced or finely-chopped meat comprising the steps of:
   inserting the composition into the tubular casing;
   cutting the stuffed tubular casing into at least one base section of a specific length having two ends;
   tapering one end of the base section to form a tapered end;
   freezing the tapered end and a portion of the base section adjacent to the tapered end;
   bending the base section; and
   connecting the tapered end to the other end of the base section to form a ring shape.

3. The method of claim 1, wherein the end of the base section wherein the tip of the pulling tool is secured to the casing is tapered.

4. The method of claim 1, wherein the pulling tool comprising a hook and the hook is hooked onto the casing.

* * * * *